United States Patent
Lefort et al.

(10) Patent No.: US 11,901,691 B2
(45) Date of Patent: Feb. 13, 2024

(54) SUBSURFACE INDUCED SCATTERING CENTERS

(71) Applicant: Lumentum Operations LLC, San Jose, CA (US)

(72) Inventors: James Lefort, Milpitas, CA (US); Richard D. Faulhaber, San Carlos, CA (US); Martin H. Muendel, Oakland, CA (US); Andreas Oehler, Zurich (CH)

(73) Assignee: Lumentum Operations LLC, San Jose, CA (US)

( * ) Notice: Subject to any disclaimer, the term of this patent is extended or adjusted under 35 U.S.C. 154(b) by 348 days.

(21) Appl. No.: 16/865,739

(22) Filed: May 4, 2020

(65) Prior Publication Data

US 2021/0296846 A1 Sep. 23, 2021

Related U.S. Application Data

(60) Provisional application No. 62/991,421, filed on Mar. 18, 2020.

(51) Int. Cl.
| | |
|---|---|
| *G02B 6/14* | (2006.01) |
| *H01S 3/108* | (2006.01) |
| *H01S 3/067* | (2006.01) |
| *H01S 3/08022* | (2023.01) |
| *G02B 6/02* | (2006.01) |
| *F21V 8/00* | (2006.01) |
| *H01S 3/00* | (2006.01) |

(52) U.S. Cl.
CPC ............ *H01S 3/1086* (2013.01); *G02B 6/004* (2013.01); *G02B 6/02* (2013.01); *G02B 6/02376* (2013.01); *H01S 3/06733* (2013.01); *H01S 3/06741* (2013.01); *H01S 3/08027* (2013.01); *G02B 6/14* (2013.01); *H01S 3/005* (2013.01)

(58) Field of Classification Search
CPC .............. G02B 6/0016; G02B 6/02085; G02B 6/02066; G02B 2006/02166
See application file for complete search history.

(56) References Cited

U.S. PATENT DOCUMENTS

| | | | | |
|---|---|---|---|---|
| 4,466,697 A | * | 8/1984 | Daniel ................ | G02B 6/0096 264/1.24 |
| 7,619,739 B1 | * | 11/2009 | Sutherland .......... | G01N 21/774 436/535 |
| 10,090,631 B2 | | 10/2018 | Hou et al. | |
| 10,327,645 B2 | * | 6/2019 | Rourke ................ | A61B 5/6851 |

(Continued)

FOREIGN PATENT DOCUMENTS

CA 2331914 A1 * 9/2001 ......... C03B 37/0122

*Primary Examiner* — Eric Wong
(74) *Attorney, Agent, or Firm* — Harrity & Harrity, LLP

(57) ABSTRACT

An optical element may include a plurality of subsurface induced scattering centers formed in the optical element, where the plurality of subsurface induced scattering centers scatter light passing through the optical element. In some implementations, the plurality of subsurface induced scattering centers may form a scattering region in the optical element. Additionally, or alternatively, the plurality of subsurface induced scattering centers may spatially vary transmission of light through the optical element. The optical element may be an optical waveguide, a bulk optic, and/or the like.

20 Claims, 4 Drawing Sheets

(56) References Cited

U.S. PATENT DOCUMENTS

| | | | |
|---|---|---|---|
| 2003/0128944 A1* | 7/2003 | Skutnik | C03C 25/1061 |
| | | | 385/144 |
| 2009/0210038 A1* | 8/2009 | Neuberger | G02B 6/262 |
| | | | 607/89 |
| 2011/0122646 A1* | 5/2011 | Bickham | G02B 6/0229 |
| | | | 264/1.29 |
| 2015/0131955 A1* | 5/2015 | Bennett | G02B 6/03633 |
| | | | 385/123 |
| 2017/0022628 A1* | 1/2017 | Breen | G02B 6/0065 |
| 2020/0049874 A1* | 2/2020 | Eckardt | G02B 6/0006 |
| 2020/0319391 A1* | 10/2020 | Vasylyev | G02B 6/005 |
| 2020/0379171 A1* | 12/2020 | Li | H04B 10/2507 |

* cited by examiner

SUBSURFACE INDUCED SCATTERING CENTERS

CROSS-REFERENCE TO RELATED APPLICATION

This Patent application claims priority to U.S. Provisional Patent Application No. 62/991,421 for a "SUBSURFACE CLADDING LIGHT STRIPPER," filed on Mar. 18, 2020, the content of which is incorporated by reference herein in its entirety.

TECHNICAL FIELD

The present disclosure relates generally to optical elements and to optical elements including subsurface induced scattering centers.

BACKGROUND

Optical elements may include optical waveguides (e.g., optical fibers, planar waveguides, silica-on-silicon waveguides, semiconductor waveguides, and/or the like) and/or bulk optics (e.g., filters, lenses, prisms, windows, polarizers, mirrors, and/or the like). Optical elements may act on electromagnetic waves in the visible, ultraviolet, and/or infrared spectrums by guiding, filtering, focusing, refracting, transmitting, reflecting, polarizing, and/or the like the electromagnetic waves.

SUMMARY

According to some implementations, an optical element may include a plurality of subsurface induced scattering centers formed in the optical element, wherein the plurality of subsurface induced scattering centers scatter light passing through the optical element.

According to some implementations, an optical fiber may include a plurality of subsurface induced scattering centers formed in the optical fiber, wherein the plurality of subsurface induced scattering centers scatter light passing through the optical fiber.

According to some implementations, a method may include focusing, by a device, emitted laser pulses on a plurality of subsurface locations within an optical element to form a subsurface induced scattering center at each of the plurality of subsurface locations.

DETAILED DESCRIPTION

Figure 1:
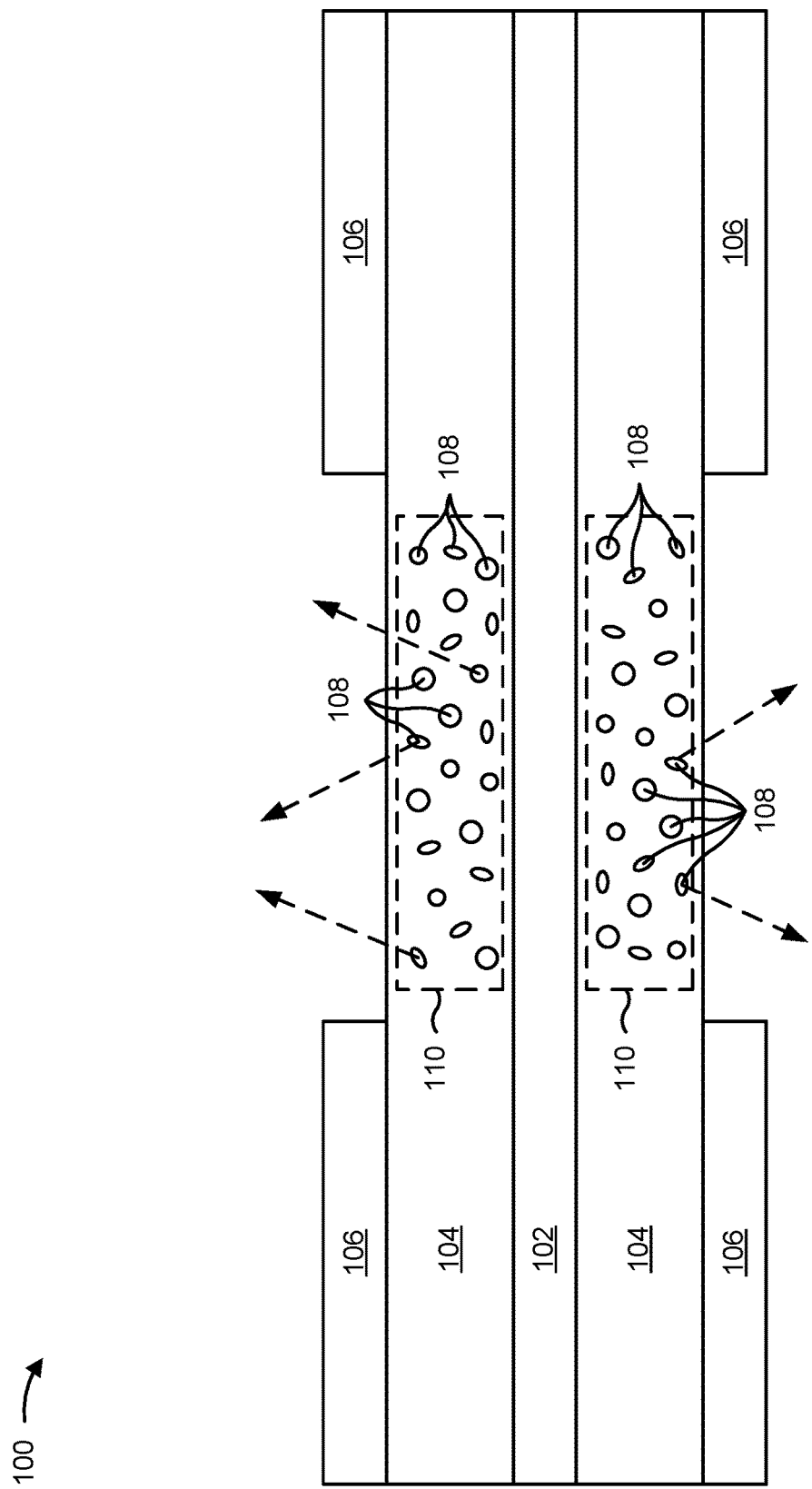
FIG. 1 is a diagram of a cross-sectional side view of an example implementation of a cladding light stripper including subsurface induced scattering centers described herein.

The following detailed description of example implementations refers to the accompanying drawings. The same reference numbers in different drawings may identify the same or similar elements.

An optical device may include one or more optical elements to perform functions within the optical device. For example, an optical device may include a fiber laser to generate an optical beam and a cladding light stripper to remove and/or strip deleterious light from the optical beam. The fiber laser may include a core and an inner cladding, where laser light propagates in the core and pump light propagates in the inner cladding. The core may be a doped core, where pump light is absorbed in the doped core to amplify the laser light. The cladding light stripper may be positioned at the end of the fiber laser to remove any cladding light (e.g., light propagating in the cladding, such as unabsorbed pump light, laser light that has escaped from the core into the cladding, and/or the like), such that, at the output of the laser, all of the output laser beam originates from the core.

One technique to remove and/or strip cladding light is to use a laser ablation system to create notches or grooves in an outer surface of an exposed inner cladding of an optical fiber. For example, after removing a portion of a coating and/or an outer cladding of the optical fiber, leaving a section of the outer surface of the inner cladding exposed, an output laser beam of a carbon dioxide ($CO_2$) laser may be focused in a spherical or elliptical focal spot on the outer surface of the exposed section. The focal spot may be shaped and/or the laser beam may be angled to produce a notch or groove having a desired shape. After one notch or groove is made by one or more shots of pulses, the laser beam may be focused onto a next position to create additional notches. The focusing and ablating step may be repeated, and the fiber may be shifted to a next position, and so on.

While this $CO_2$ laser notching technique may be effective in positioning and/or orienting the notches or grooves to remove cladding light, $CO_2$ laser notching tends to weaken the fiber by lowering the tensile strength (e.g., depending on the depth and number of notches) and may create sites for contamination and stress fractures. Furthermore, in fibers with an internal glass cladding for pump light, such as triple-clad laser fiber and large-mode-area (LMA) photonic-crystal fiber (PCF), using $CO_2$ laser notching to strip cladding light from the internal pump guide is challenging, because the notches need to extend all the way through the outer glass cladding layer into the pump guide. For example, these fibers may have internal low index/high index interfaces that can be over 100 microns below the fiber surface, and notches of this depth may significantly reduce the strength of the fiber and increase the probability of fiber breaks. Additionally, the $CO_2$ laser notching technique requires a vacuuming process to capture released silica dust and prevent silicosis.

Some implementations described herein relate to a fiber including subsurface induced scattering centers, where the fiber may function as a cladding light stripper. The subsurface induced scattering centers may form a scattering region within the fiber to, for example, remove cladding light. In some implementations, the subsurface induced scattering centers may include voids, portions of material having modified refractive indices as compared to other portions of material surrounding the portions of material, cracks, densified regions, and/or the like. The subsurface induced scattering centers may be formed, for example, by focusing emitted laser pulses on a plurality of subsurface locations to form a subsurface induced scattering center at each of the plurality of subsurface locations. By forming the scattering centers below the surface of the fiber, the strength of the fiber may be maintained, and the scattering centers may not create sites for contamination and stress fractures. Furthermore, the subsurface induced scattering centers may be formed at a greater depth (e.g., for fibers with an internal glass cladding) without reducing strength of the fiber or increasing the probability of fiber breaks. Additionally, forming the scattering centers below the surface of the fiber with emitted laser pulses does not require a vacuuming process to capture released silica dust and prevent silicosis.

Some implementations described herein may also relate to other optical elements (e.g., in addition to a cladding light stripper) including subsurface induced scattering centers (e.g., subsurface light scattering centers) to scatter light passing through the optical elements. For example, the optical element may be an optical waveguide (e.g., an optical fiber, a planar waveguide, a silica-on-silicon waveguide, a semiconductor waveguide, and/or the like). In some implementations, the optical element may be an optical fiber including a core and a cladding, where a plurality of subsurface induced scattering centers are formed in at least one of the core or the cladding.

In another example, the optical element may be a bulk optic (e.g., a filter, a lens, a prism, a window, a polarizer, a mirror, and/or the like). In some implementations, the bulk optic may include a plurality of subsurface induced scattering centers, where the plurality of subsurface induced scattering centers spatially vary transmission of light through the bulk optic. By forming the scattering centers below the surface of the bulk optic, the durability of the bulk optic may be improved by the elimination of surface coatings and/or surface treatments, which may be prone to scratches, contamination, chipping, and/or the like. Additionally, or alternatively, using focused, emitted laser pulses to form the scattering centers may be a less complicated and/or expensive method of manufacturing the bulk optic as compared to applying surface coatings and/or surface treatments.

FIG. 1 is a diagram of a cross-sectional side view of an example implementation of a cladding light stripper 100 including subsurface induced scattering centers 108 described herein. For example, and as shown in FIG. 1, the cladding light stripper may be an optical fiber including a core 102, a cladding 104, and a coating 106 (e.g., a protective coating, a polymeric coating, and/or the like). The cladding 104 may surround the core 102, and the coating 106 may surround the cladding 104.

In some implementations, the core 102 may be configured to receive an output laser beam from a fiber laser. For example, the core 102 may have a refractive index, a radial width, and/or the like corresponding to a core of the fiber laser, such that the light propagating in the core of the fiber laser exits the fiber laser and enters the core 102.

In some implementations, the cladding 104 may be configured to confine light propagating in the core 102 and/or to receive cladding light from a fiber laser. For example, the cladding 104 may have a refractive index, a radial width, and/or the like corresponding to a cladding of the fiber laser, such that the light propagating in the cladding of the fiber laser exits the fiber laser and enters the cladding 104.

Additionally, or alternatively, an optical device may include a fiber laser and the cladding light stripper 100, where the fiber laser and the cladding light stripper 100 are formed in the same optical fiber. For example, a lengthwise portion of the core 102, the cladding 104, and the coating 106 may form the fiber laser, and another lengthwise portion of the core 102, the cladding 104, and the coating 106 (e.g., the portions shown in FIG. 1) may form the cladding light stripper 100.

As shown in FIG. 1, the cladding light stripper 100 includes subsurface induced scattering centers 108 in the cladding 104. In some implementations, and as shown by the arrows in FIG. 1, the subsurface induced scattering centers 108 may scatter light passing through the cladding 104. For example, the subsurface induced scattering centers 108 may scatter cladding light outward toward an exterior surface. In some implementations, and as shown in FIG. 1, the coating 106 of the cladding light stripper 100 may be removed, such that scattered light may exit the cladding light stripper 100 without passing through coating 106. In some implementations, the coating 106 may be removed to avoid burning the coating 106 and/or beam distortion when forming the subsurface induced scattering centers 108. Additionally, or alternatively, the coating 106 may be removed to avoid burning the coating 106 when scattered light exits the cladding light stripper 100.

In some implementations, the subsurface induced scattering centers 108 may scatter (e.g., randomly) light incident on the subsurface induced scattering centers 108 rather than guiding or re-directing incident light. For example, a subsurface induced scattering center (e.g., of the subsurface induced scattering centers 108) may scatter light at an angle which is dependent on an angle or position at which the light is incident on the subsurface induced scattering center. Additionally, or alternatively, the subsurface induced scattering centers 108 may scatter light of any wavelength that is incident on the subsurface induced scattering centers 108.

As shown in FIG. 1, the subsurface induced scattering centers 108 may form a scattering region 110 in the cladding light stripper 100. In some implementations, the scattering region 110 may have a spiral shape, a periodic shape (e.g., a shape with a spatially repeated pattern), a pseudo-random shape (e.g., a shape having no periodic structure, a shape having mathematical properties resembling a random distribution, and/or the like), a helical shape, a band, a conical shape, and/or the like. In some implementations, the scattering region 110 may include a wave of subsurface induced scattering centers 108 along the length of the cladding light stripper 100. Additionally, or alternatively, the scattering region 110 may have a variable pitch (e.g., a variable number of subsurface induced scattering centers 108 per unit length), have a variable density (e.g., a variable number of subsurface induced scattering centers 108 per unit volume), be continuous along the length of the cladding light stripper 100, be discontinuous along the length of the cladding light stripper 100, and/or the like. In some implementations, and as shown in FIG. 1, the coating 106 of the cladding light stripper 100 may be removed from an exterior surface corresponding to the scattering region 110, such that scattered light may exit the cladding light stripper 100 without passing through coating 106.

In some implementations, the subsurface induced scattering centers 108 may be voids, portions of material having modified refractive indices as compared to other portions of material surrounding the portions of material, cracks, densified regions, and/or the like. For example, the subsurface induced scattering centers 108 may be vacuum-filled voids, gas-filled voids, and/or the like. In some implementations, the subsurface induced scattering centers may have a size in a range from approximately 1 micron to 100 microns. In some implementations, the subsurface induced scattering centers may have a shape such as a sphere, an ellipsoid, an ovoid, a toroid, a crack, and/or the like.

In some implementations, the subsurface induced scattering centers 108 may be pseudo-randomly positioned in the cladding light stripper 100. Additionally, or alternatively, the subsurface induced scattering centers 108 may have pseudo-random shapes (e.g., some sphere-shaped, others-ellipsoidshaped, others ovoid-shaped, others toroid-shaped, others crack-shaped, and/or the like). Additionally, or alternatively, the subsurface induced scattering centers 108 may be pseudo-randomly sized.

In some implementations, the cladding light stripper 100 may be formed of a material, such as a glass material, a fused silica material, and/or the like, and the subsurface induced scattering centers 108 may be formed using laser pulses having a wavelength at which the material is transparent (e.g., a wavelength in a range from ultraviolet to infrared, a wavelength in a range from 10 nanometers to 1 millimeter, a wavelength in a range from 100 nanometers to 20 microns, and/or the like). For example, the subsurface induced scattering centers 108 may be formed by focusing emitted laser pulses on subsurface locations within the cladding light stripper 100 to form the subsurface induced scattering centers 108. In some implementations, when focusing the emitted laser pulses on subsurface locations, a lens effect of a curvature of the exterior surface of the cladding light stripper 100 may be compensated for, to achieve a subsurface induced scattering center at a given subsurface location.

In some implementations, the emitted laser pulses may have a pulse length that is less than a time to thermally diffuse the material forming the cladding light stripper 100. For example, the emitted laser pulses may have a pulse length of a nanosecond, a picosecond, a femtosecond, and/or the like.

In this way, an emitted laser pulse may pass through the material (e.g., because it is transparent to the wavelength of the laser pulse) to a subsurface location at which the emitted laser pulse is focused, and form a subsurface induced scattering center at the subsurface location without thermally diffusing the material around the subsurface location. For example, the emitted laser pulse may vaporize a portion of the material, create a void in the material, create a crack in the material, create a densified region in the material, modify a refractive index of the material (e.g., due to stress and/or density modification), and/or the like. In some implementations, the emitted laser pulse may form a subsurface induced scattering center where a power density inside the material due to a nonlinear absorption effect creates high absorption at a subsurface location at which the emitted laser pulse is focused.

In some implementations, a series of laser pulses may be focused at different subsurface locations to form subsurface induced scattering centers 108 at each of the different subsurface locations. Additionally, or alternatively, multiple laser pulses may be focused at adjacent subsurface locations such that subsurface induced scattering centers 108 at the adjacent subsurface locations form a combined subsurface induced scattering center having a larger size, a particular shape, a particular orientation, and/or the like.

In some implementations, characteristics (e.g., size, shape, orientation, and/or the like) of the subsurface induced scattering centers 108 may be adjusted by controlling laser parameters. For example, the laser parameters may include a pulse width of the emitted laser pulses, a wavelength of the emitted laser pulses, a power of the emitted laser pulses, a repetition rate of the emitted laser pulses, an orientation at which the laser pulses are emitted, a direction of propagation of the emitted laser pulses, a spot size of the emitted laser pulses, a beam divergence of the emitted laser pulses, a beam shape of the emitted laser pulses, a type of laser source used to generate the emitted laser pulses, and/or the like.

As described above, and as shown in FIG. 1, the coating 106 of the cladding light stripper 100 may be removed such that scattered light may exit the cladding light stripper 100.

In some implementations, the coating 106 of the cladding light stripper 100 may be removed before the subsurface induced scattering centers 108 are formed in the cladding 104. Additionally, or alternatively, the cladding light stripper 100 may be recoated after the subsurface induced scattering centers 108 are formed in the cladding 104.

In some implementations, the coating 106 of the cladding light stripper 100 may not be removed, and scattered light may pass through and/or be absorbed by the coating 106. Additionally, or alternatively, the subsurface induced scattering centers 108 may be formed in the cladding 104 by emitting laser pulses through the protective coating.

As indicated above, FIG. 1 is provided merely as an example. Other examples are contemplated and may differ from what is described with regard to FIG. 1. In some implementations, other examples may include an optical fiber including subsurface induced scattering centers formed in a core and a cladding of the optical fiber or only in a core of the optical fiber. For example, a fiber laser may include subsurface induced scattering centers formed in a core to suppress core lasing, core-light transmission, and/or the like in a portion of the fiber laser, while allowing pump light and/or other light in a cladding region to pass unaffected. Additionally, or alternatively, an optical fiber may include subsurface induced scattering centers formed in a core to create an enhanced side-scatter from the core in an area of the optical fiber to facilitate monitoring of core power (e.g., via a photodiode, a power meter, and/or the like).

As another example, an optical fiber may include multiple cladding layers and subsurface induced scattering centers formed in one or more of the cladding layers. In some implementations, an optical fiber including subsurface induced scattering centers may be a double-clad laser fiber (e.g., including a core, an inner cladding, and an outer cladding), a triple-clad laser fiber (e.g., including a core, a first inner cladding, a second inner cladding, and an outer cladding), a large-mode-area (LMA) photonic-crystal fiber (PCF), and/or the like. Other examples may include optical waveguides, such as planar waveguides, silica-on-silicon waveguides, semiconductor waveguides (e.g., including laser diodes), and/or the like.

Figure 2:
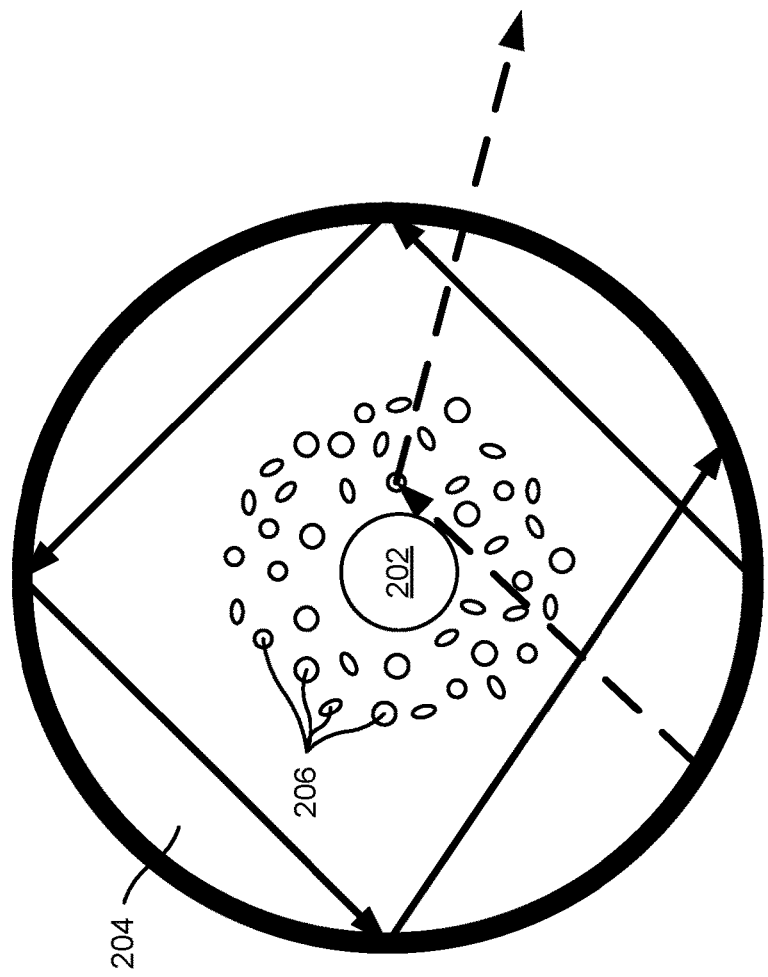
FIG. 2 is a diagram of a cross-sectional view of an example implementation of a fiber modal filter including subsurface induced scattering centers described herein.

FIG. 2 is a diagram of a cross-sectional view of an example implementation of a fiber modal filter 200 including subsurface induced scattering centers 206 described herein. As shown in FIG. 2, the fiber modal filter 200 includes a core 202, a cladding 204, and subsurface induced scattering centers 206. In some implementations, the subsurface induced scattering centers 206 may be similar to the subsurface induced scattering centers 108 described herein with respect to FIG. 1. Additionally, or alternatively, the fiber modal filter 200 may be formed of a material, such as a glass material, a fused silica material, and/or the like, and the subsurface induced scattering centers 206 may be formed using laser pulses in a manner similar to that described herein with respect to FIG. 1.

As shown in FIG. 2, the subsurface induced scattering centers 206 may be positioned and/or formed near a central axis of the fiber modal filter 200. For example, and as shown in FIG. 2, the subsurface induced scattering centers 206 may be positioned and/or formed around the core 202.

As shown by the dashed arrows in FIG. 2, meridional light (e.g., light passing through and/or near the central axis of the fiber modal filter 200) may be scattered by the subsurface induced scattering centers 206 and exit the fiber modal filter 200. As shown by the solid arrows in FIG. 2, skew light (e.g., light traveling in a non-planar path, light traveling in a path that does not pass through and/or near the central axis of the fiber modal filter 200, and/or the like) may propagate through the cladding 204 (e.g., unaffected by the subsurface induced scattering centers 206). In this way, the subsurface induced scattering centers 206 may be positioned such that the fiber modal filter 200 selectively scatters and/or strips meridional light and allows skew light to pass unaffected.

As indicated above, FIG. 2 is provided merely as an example. Other examples are contemplated and may differ from what is described with regard to FIG. 2.

Figure 3:
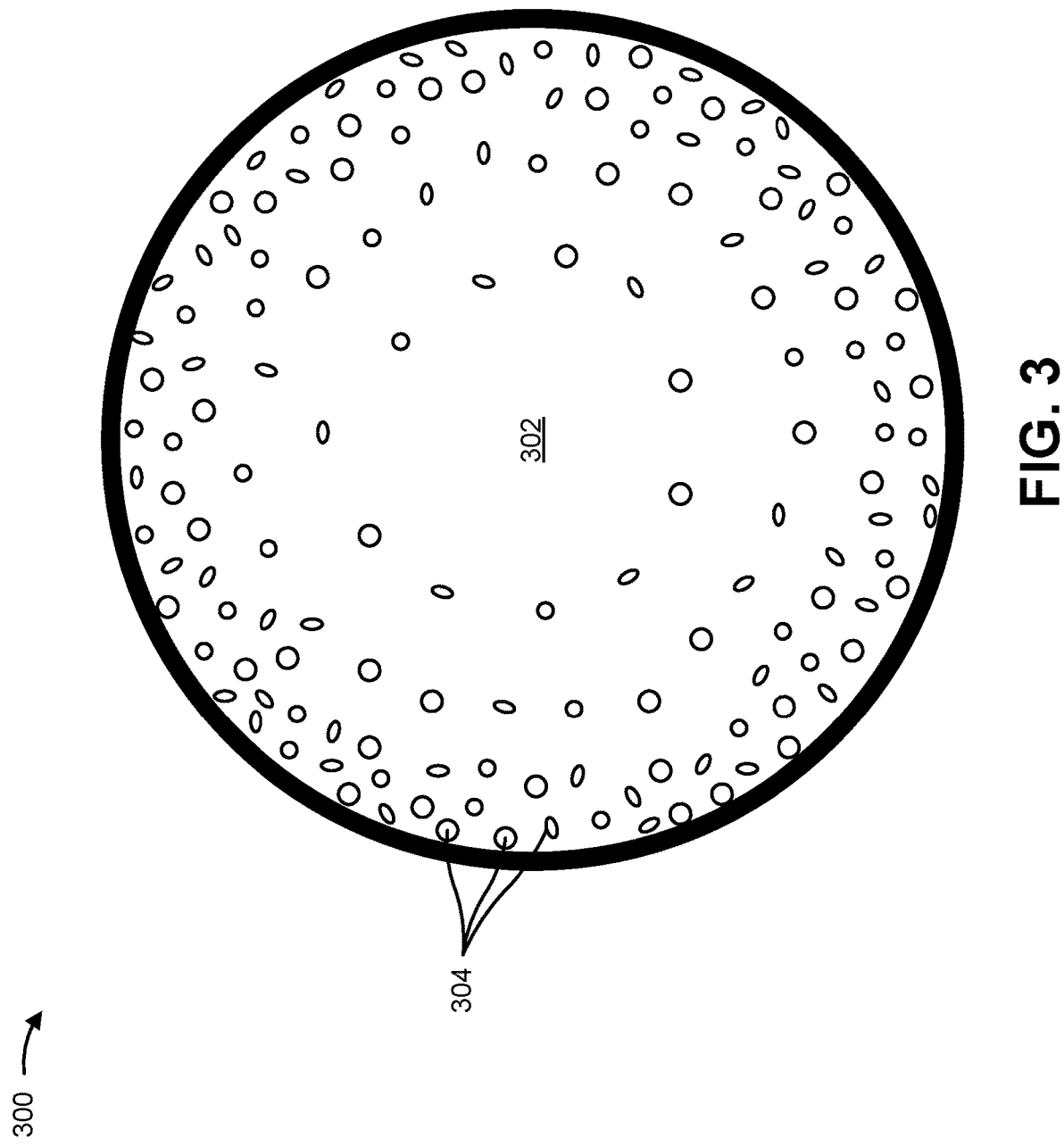
FIG. 3 is a diagram of an example implementation of an apodizing filter including subsurface induced scattering centers described herein.

FIG. 3 is a diagram of an example implementation of an apodizing filter 300 including subsurface induced scattering centers 304 described herein. As shown in FIG. 3, the apodizing filter 300 (e.g., a filter with spatially varying transmission) may include a body 302, and the subsurface induced scattering centers 304 may be positioned in and/or formed in the body 302.

In some implementations, and as shown in FIG. 3, the body 302 may have a round shape. Additionally, or alternatively, the body 302 may have another shape, such as a square, a rectangle, a triangle, and/or the like, and the shape of the body 302 may be based on an intended application for the apodizing filter 300.

In some implementations, the body 302 may be formed from a material, such as glass, crystal, fused silica, sapphire, zinc selenide (ZnSe), calcium fluoride ($CaF_2$), plastics, semiconductors, and/or the like. In some implementations, the material forming the body 302 may be a crystal.

In some implementations, the subsurface induced scattering centers 304 may be similar to the subsurface induced scattering centers 108 described herein with respect to FIG. 1. Additionally, or alternatively, the subsurface induced scattering centers 304 may be formed using laser pulses in a manner similar to that described herein with respect to FIG. 1.

In some implementations, the subsurface induced scattering centers 304 may be positioned in and/or formed in the body 302 such that higher densities and/or concentrations of subsurface induced scattering centers 304 are positioned to form higher scattering (e.g., attenuation) regions of the body 302, and lower densities and/or concentrations of subsurface induced scattering centers 304 are positioned to form lower scattering regions of the body 302. Additionally, or alternatively, regions of the body 302 for transmitting light without scattering may include no subsurface induced scattering centers 304.

For example, and as shown in FIG. 3, a higher density and/or concentration of subsurface induced scattering centers 304 are positioned around an outer edge of the body 302 to form a higher scattering region of the body 302, and the density and/or concentration of subsurface induced scattering centers 304 may decrease from the outer edge to zero at a central region of the body 302. In this way, when an optical beam is transmitted through the apodizing filter 300, the subsurface induced scattering centers 304 may scatter (e.g., attenuate, truncate, and/or the like) outer portions of the optical beam (e.g., wings of the optical beam), while a central portion of the optical beam passes through the apodizing filter 300 without being attenuated. In order to provide a smooth yet attenuated transmitted beam profile, the size of the subsurface induced scattering centers may be chosen to be small compared to a transverse wavelength of the transmitted beam. For example, if the wavelength of the beam is 1 micron, and the beam divergence is 0.01 radians, then a transverse wavelength may be calculated as 1/0.01 or 100 microns. In order to produce a transmitted beam profile that does not show obvious gaps where portions of the beam have been scattered by scattering centers 304, the size of the scattering centers may be designed to be small compared to 100 microns, for example 10 microns or even 1 micron.

By using subsurface modifications to the body 302 (e.g., the subsurface induced scattering centers 304) to achieve spatially varying transmission, the apodizing filter 300 may be easier to manufacture, handle, clean, and/or the like, as compared to an apodizing filter using surface modifications (e.g., spatially-varying thin-film coatings, spatially-varying surface roughening, and/or the like) to achieve spatially varying transmission. Additionally, or alternatively, using subsurface induced scattering centers 304 to achieve spatially varying transmission may provide better control of spatial variance and greater reliability than an apodizing filter using surface modifications.

As indicated above, FIG. 3 is provided merely as an example. Other examples are contemplated and may differ from what is described with regard to FIG. 3. For example, although the example implementation of FIG. 3 describes a bulk optic in the form of an apodizing filter, some implementations may include other types of bulk optics, such as lenses, prisms, windows, polarizers, mirrors, and/or the like, that include subsurface induced scattering centers. In such implementations, the bulk optic may be formed of a material (e.g., glass, fused silica, sapphire, zinc selenide (ZnSe), calcium fluoride ($CaF_2$), plastics, and/or the like) that is transparent to a laser pulse, and the subsurface induced scattering centers may be formed using laser pulses in a manner similar to that described herein with respect to FIG. 1.

Figure 4:
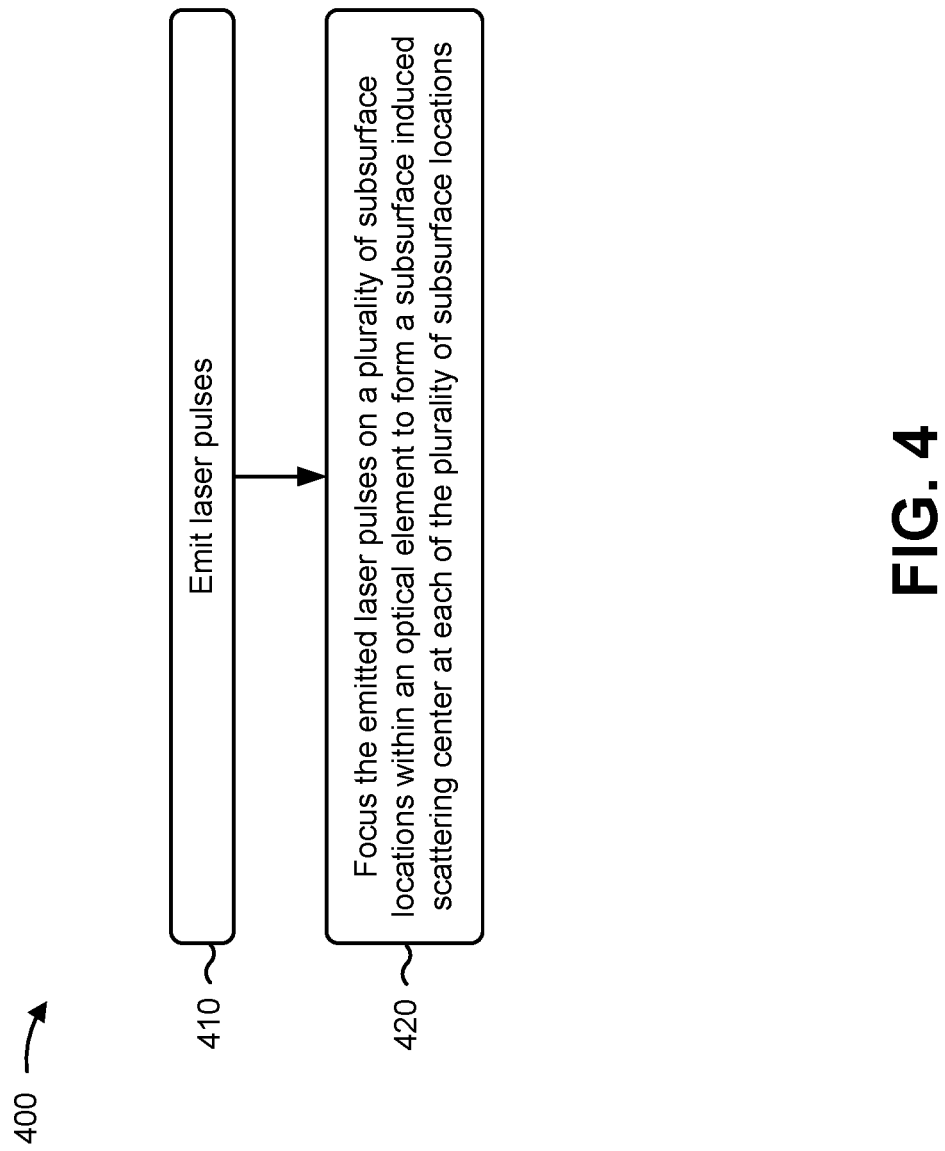
FIG. 4 is a flow chart of an example process for forming subsurface induced scattering centers in an optical element.

FIG. 4 is a flow chart of an example process 400 associated with forming subsurface induced scattering centers in an optical element. In some implementations, one or more process blocks of FIG. 4 may be performed by an optical device (e.g., a laser system, a short-pulsed laser system, an ultrafast laser system, an ultrashort-pulsed laser system, a sub-nanosecond pulse laser system, and/or the like). In some implementations, one or more process blocks of FIG. 4 may be performed by another device or a group of devices separate from or including the optical device, such as a lens system, and/or the like.

As shown in FIG. 4, process 400 may include emitting laser pulses (block 410). For example, the optical device (e.g., using a laser source, a laser driving circuit, a lens system, and/or the like) may emit laser pulses, as described above.

As shown in FIG. 4, process 400 may include focusing emitted laser pulses on a plurality of subsurface locations within an optical element to form a subsurface induced scattering center at each of the plurality of subsurface locations (block 420). For example, the optical device (e.g., using a laser source, a laser driving circuit, a lens system, and/or the like) may focus emitted laser pulses on a plurality of subsurface locations within an optical element to form a subsurface induced scattering center at each of the plurality of subsurface locations, as described above.

Process 400 may include additional implementations, such as any single implementation or any combination of implementations described below and/or in connection with one or more other processes described elsewhere herein.

In a first implementation, the emitted laser pulses have a pulse length that is less than a thermal diffusion time constant for a material forming the optical element.

In a second implementation, alone or in combination with the first implementation, a pulse length of the emitted laser pulses is at least one of: less than 300 nanoseconds, less than one nanosecond, less than one picosecond, less than 900 femtoseconds, or less than 500 femtoseconds.

In a third implementation, alone or in combination with one or more of the first and second implementations, the emitted laser pulses have a wavelength, and the optical element is transparent at the wavelength.

In a fourth implementation, alone or in combination with one or more of the first through third implementations, the emitted laser pulses have a wavelength in a range from ultraviolet wavelengths to infrared wavelengths.

In a fifth implementation, alone or in combination with one or more of the first through fourth implementations, the emitted laser pulses have a wavelength in a range from 100 nanometers to 20 microns.

In a sixth implementation, alone or in combination with one or more of the first through fifth implementations, an emitted laser pulse of the emitted laser pulses vaporizes a portion of material forming the optical element to form the subsurface induced scattering center.

In a seventh implementation, alone or in combination with one or more of the first through sixth implementations, process 400 includes controlling, to adjust characteristics of the subsurface induced scattering center at each of the plurality of subsurface locations, at least one of a pulse width of the emitted laser pulses, a wavelength of the emitted laser pulses, a power of the emitted laser pulses, a spot size of the emitted laser pulses, a divergence of the emitted laser pulses, or a repetition rate of focusing the emitted laser pulses at the plurality of subsurface locations.

In an eighth implementation, alone or in combination with one or more of the first through seventh implementations, focusing the emitted laser pulses on a plurality of subsurface locations within the optical element comprises: focusing a first emitted laser pulse of the emitted laser pulses on a first subsurface location within the optical element to form a first subsurface induced scattering center, and focusing a second emitted laser pulse of the emitted laser pulses on a second subsurface location within the optical element to form a second subsurface induced scattering center.

In a ninth implementation, alone or in combination with one or more of the first through eighth implementations, the second subsurface location is adjacent to the first subsurface location.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apodizing filter, comprising:
   a plurality of subsurface induced scattering centers formed in the apodizing filter,
     wherein the plurality of subsurface induced scattering centers scatter light passing through the apodizing filter, and
     wherein the apodizing filter is included in a cladding of a portion of an optical fiber,
       wherein the portion of the optical fiber comprises a cladding light stripper.

2. The apodizing filter of claim 1, comprising a glass material,
   wherein the plurality of subsurface induced scattering centers are formed in the glass material.

3. The apodizing filter of claim 1, wherein each of the plurality of subsurface induced scattering centers has a size in a range from approximately 1 micron to 100 microns.

4. The apodizing filter of claim 1, wherein the plurality of subsurface induced scattering centers comprise at least one of:
   voids;
   portions of material having modified refractive indices as compared to other portions of material surrounding the portions of material;
   cracks; or
   densified regions.

5. The apodizing filter of claim 4, wherein the voids comprise at least one of:
   a vacuum formed in the apodizing filter; or
   a gas-filled void.

6. The apodizing filter of claim 1, wherein the plurality of subsurface induced scattering centers have a shape comprising at least one of a sphere, an ellipsoid, an ovoid, or a toroid.

7. The apodizing filter of claim 1, wherein the plurality of subsurface induced scattering centers spatially vary transmission of light through the cladding.

8. An optical fiber, comprising:
   a plurality of subsurface induced scattering centers formed in a cladding of a first portion of the optical fiber,
     wherein the plurality of subsurface induced scattering centers form an apodizing filter to scatter light passing through the optical fiber, and wherein the plurality of subsurface induced scattering centers are not included in the cladding of a second portion of the optical fiber.

9. The optical fiber of claim 8, wherein the first portion of the optical fiber comprises at least one of:
   a cladding light stripper;
   a double-clad laser fiber;
   a triple-clad laser fiber;
   a large-mode-area photonic crystal fiber; or
   a fiber modal filter.

10. The optical fiber of claim 8, further comprising:
   a protective coating on an exterior surface of the optical fiber, and
   wherein the plurality of subsurface induced scattering centers are formed in the cladding of the first portion of the optical fiber through the protective coating.

11. The optical fiber of claim 8, wherein the plurality of subsurface induced scattering centers form a scattering region in the cladding of the first portion of the optical fiber.

12. A method, comprising:
   focusing, by a device, emitted laser pulses on a plurality of subsurface locations within a cladding portion of an optical element to form a subsurface induced scattering center at each of the plurality of subsurface locations,
   wherein an emitted laser pulse of the emitted laser pulses vaporizes a portion of material forming the optical element to form the subsurface induced scattering center.

13. The method of claim 12, wherein the emitted laser pulses have a pulse length that is less than a time to thermally diffuse a material forming the optical element.

14. The method of claim 12, further comprising:
   controlling, to adjust characteristics of the subsurface induced scattering center at each of the plurality of subsurface locations, at least one of a pulse width of the emitted laser pulses, a wavelength of the emitted laser pulses, a power of the emitted laser pulses, a spot size of the emitted laser pulses, a divergence of the emitted laser pulses, or a repetition rate of focusing the emitted laser pulses at the plurality of subsurface locations.

15. The method of claim 12, wherein focusing the emitted laser pulses on a plurality of subsurface locations within the cladding portion of the optical element comprises:
   focusing a first emitted laser pulse of the emitted laser pulses on a first subsurface location within the cladding portion of the optical element to form a first subsurface induced scattering center; and
   focusing a second emitted laser pulse of the emitted laser pulses on a second subsurface location within the cladding portion of the optical element to form a second subsurface induced scattering center.

16. The method of claim 12, wherein the optical element comprises an apodizing filter that is included in at least one of:
   a bulk optic, or the cladding of a portion of an optical fiber,
   wherein the portion of the optical fiber is associated with a cladding light stripper of the optical fiber.

17. The method of claim 12, wherein the subsurface induced scattering center comprises a void.

18. The method of claim 12, wherein the plurality of subsurface locations are within the cladding portion of an optical fiber.

19. The optical fiber of claim 8, wherein the plurality of subsurface induced scattering centers comprise at least one of:
   voids;
   portions of material having modified refractive indices as compared to other portions of material surrounding the portions of material;
   cracks; or
   densified regions.

20. The optical fiber of claim 19, wherein the voids comprise at least one of:
   a vacuum formed in the apodizing filter; or
   a gas-filled void.

* * * * *